(12) United States Patent  
Hirashita et al.

(10) Patent No.: US 9,231,278 B2
(45) Date of Patent: Jan. 5, 2016

(54) ELECTROLYTE SOLUTION FOR MAGNESIUM BATTERY AND MAGNESIUM BATTERY CONTAINING THIS ELECTROLYTE SOLUTION

(71) Applicants: Tsunehisa Hirashita, Nagoya (JP); Hirofumi Nakamoto, Susono (JP)

(72) Inventors: Tsunehisa Hirashita, Nagoya (JP); Hirofumi Nakamoto, Susono (JP)

(73) Assignees: NATIONAL UNIVERSITY CORPORATION NAGOYA INSTITUTE OF TECHNOLOGY, Nagoya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 14/192,156

(22) Filed: Feb. 27, 2014

(65) Prior Publication Data

US 2014/0242473 A1    Aug. 28, 2014

(30) Foreign Application Priority Data

Feb. 28, 2013    (JP) .................. 2013-039407

(51) Int. Cl.
*H01M 6/16*    (2006.01)
*H01M 10/0569*    (2010.01)
*H01M 10/054*    (2010.01)

(52) U.S. Cl.
CPC ........ *H01M 10/0569* (2013.01); *H01M 10/054* (2013.01); *H01M 2300/0028* (2013.01)

(58) Field of Classification Search
CPC ............................................. H01M 2300/0028
See application file for complete search history.

(56) References Cited

U.S. PATENT DOCUMENTS

| 2007/0026318 A1 | 2/2007 | Kishi et al. | |
| 2008/0176124 A1 | 7/2008 | Imagawa et al. | |
| 2012/0171577 A1* | 7/2012 | Ryu et al. | 429/326 |
| 2012/0219867 A1 | 8/2012 | Nuli et al. | |
| 2013/0209915 A1 | 8/2013 | Hirashita et al. | |
| 2014/0220476 A1 | 8/2014 | Hirashita et al. | |

FOREIGN PATENT DOCUMENTS

| JP | H04-296471 A | 10/1992 |
| JP | 2003-123838 A | 4/2003 |
| JP | 2007-035413 A | 2/2007 |
| JP | A-2007-280627 | 10/2007 |
| JP | A-2012-48874 | 3/2012 |
| JP | 2012094278 A | 5/2012 |
| JP | 2012142196 A | 7/2012 |
| JP | A-2012-150924 | 8/2012 |
| JP | A-2012-182124 | 9/2012 |
| WO | 2008056776 A1 | 5/2008 |
| WO | 2012/056292 A1 | 5/2012 |
| WO | WO 2013/031776 A1 | 3/2013 |

OTHER PUBLICATIONS

Partial Translation of Dec. 22, 2014 Office Action issued in Japanese Application No. 2013-039407.
Aurbach et al., "A short review on the comparision between Li battery systems and rechargeable magnesium battery technology," Journal of Power Sources, 97-98, (2001), pp. 28-32.
Tutusaus et al., "An Efficient Halogen-Free Electrolyte for Use in Rechargeable Magnesium Batteries," Angew. Chem. Int. Ed., 54 (2015), pp. 1-6.
Jul. 16, 2015 Restriction Requirement issued in U.S. Appl. No. 14/241,224.
Partial translation of Mar. 17, 2015 Office Action issued in Japanese Patent Application No. 2013-531331.
Oct. 15, 2015 Office Action issued in U.S. Appl. No. 14/241,224.
STN Search.

* cited by examiner

*Primary Examiner* — Jane Rhee
(74) *Attorney, Agent, or Firm* — Oliff PLC

(57) ABSTRACT

Provided is an electrolyte solution for a magnesium battery, containing a mesoionic compound represented by the following general formula (1):

general formula (1)

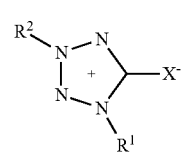

(in general formula (1), $R^1$ and $R^2$ are each independently a $C_{1-7}$ hydrocarbyl group or oxygen-containing hydrocarbyl group and X is O or S).

6 Claims, 2 Drawing Sheets

ELECTROLYTE SOLUTION FOR MAGNESIUM BATTERY AND MAGNESIUM BATTERY CONTAINING THIS ELECTROLYTE SOLUTION

INCORPORATION BY REFERENCE

The disclosure of Japanese Patent Application No. 2013-039407 filed on Feb. 28, 2013 including the specification, drawings and abstract is incorporated herein by reference in its entirety.

BACKGROUND OF THE INVENTION

1. Field of the Invention

The invention relates to an electrolyte solution that, when used in a magnesium battery, provides a larger redox current than heretofore and to a magnesium battery that contains this electrolyte solution.

2. Description of Related Art

A secondary battery is capable of discharging by converting a decline in chemical energy associated with a chemical reaction into electrical energy. A secondary battery is also capable of accumulation (charging) by converting electrical energy to chemical energy when the flow of current is reversed from that during discharge. Magnesium batteries use magnesium, which is an abundant natural resource, is easy to handle, and has a high energy density, and have been under development for a relatively long time among secondary batteries.

The reaction in equation (I) occurs at the negative electrode during discharge in the case of a magnesium battery that uses magnesium metal as its negative electrode active material.

$$Mg \rightarrow Mg^{2+} + 2e^- \quad (I)$$

The electrons produced according to equation (I) travel through the external circuit and perform work at an external load and subsequently reach the positive electrode. The magnesium ion ($Mg^{2+}$) produced in equation (I) moves from the negative electrode side to the positive electrode side by electroosmosis within the electrolyte sandwiched between the negative electrode and positive electrode.

In addition, the reaction in equation (II) occurs at the positive electrode during discharge when vanadium pentoxide ($V_2O_5$) is used as the positive electrode active material.

$$V_2O_5 + Mg^{2+} + 2e^- \rightarrow MgV_2O_5 \quad (II)$$

During charging, the reverse reactions in equations (I) and (II) occur, respectively, at the negative electrode and positive electrode, and magnesium is regenerated at the negative electrode and vanadium pentoxide ($V_2O_5$) is regenerated at the positive electrode, thus enabling discharge to occur again.

The art of a magnesium secondary battery electrolyte solution containing an ester-type electrolyte solution that incorporates a condensed phosphate is disclosed in Japanese Patent Application Publication No. 2012-150924 (JP 2012-150924 A) as art related to magnesium battery electrolyte solutions.

A solution provided by the addition of a condensed phosphate to an ester-type electrolyte solution, e.g., a propylene carbonate (PC) solution, is described as an electrolyte solution in paragraph [0020] of the Description in JP 2012-150924 A.

SUMMARY OF THE INVENTION

As a result of investigations by the inventors, it was shown that a conventional magnesium battery that uses an organic solvent for the electrolyte solution exhibits a small redox current. In addition, there have been limits on improving the reliability of conventional magnesium batteries that use a flammable and volatile organic solvent such as PC.

In contrast, to this, magnesium batteries are already available that use an ionic liquid (molten salt at normal temperature) for the electrolyte solution in an effort to improve the reliability. This ionic liquid refers to a salt that is a liquid at or below 100° C. and is generally nonvolatile. Such a nonvolatile electrolyte solution not only can improve the reliability, but also offers the advantages of exhibiting a relatively broad potential window (potential region) and a relatively high ionic conductivity. The invention was achieved in view of the circumstances described in the preceding and provides an electrolyte solution that, when used in a magnesium battery, can yield a larger redox current than heretofore, and also provides a magnesium battery that contains this electrolyte solution.

The magnesium battery electrolyte solution according to the invention contains a mesoionic compound as represented by the following general formula (1).

[C1]

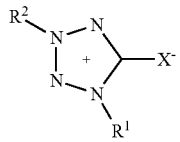

general formula (1)

(In general formula (1), $R^1$ and $R^2$ are each independently a $C_{1-7}$ hydrocarbyl group or oxygen-containing hydrocarbyl group and X is O or S.)

The magnesium battery electrolyte solution according to the invention preferably also contains a magnesium salt at a concentration of 0.01 to 1.5 mol/kg.

The magnesium battery according to the invention is a battery that is provided with at least a positive electrode, a negative electrode, and an electrolyte solution layer interposed between the positive electrode and the negative electrode, wherein this electrolyte solution layer may contain the magnesium battery electrolyte solution described above.

The incorporation of the mesoionic compound according to the invention can provide a large redox current during use in a magnesium battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
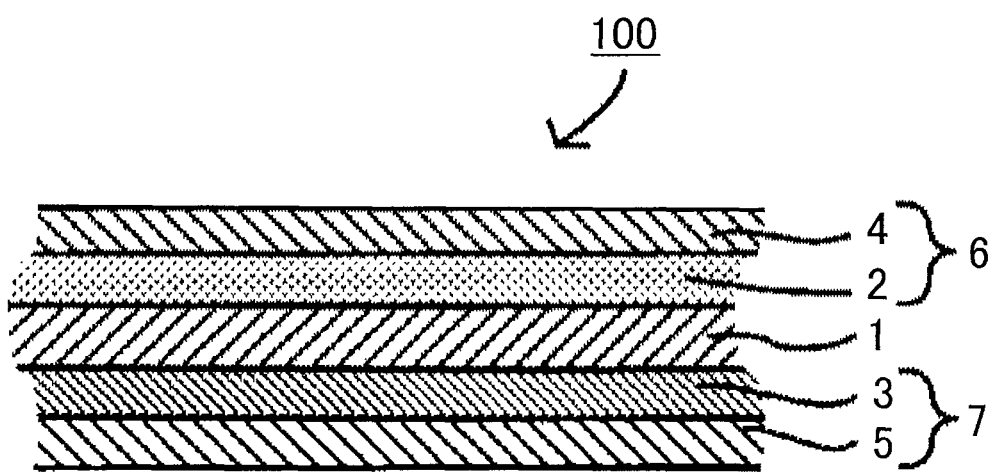
FIG. 1 is a drawing that illustrates an example of the layer structure in a magnesium battery according to the invention, wherein the drawing schematically illustrates a cross section cut in the lamination direction.

1. The magnesium battery electrolyte solution according to the invention contains the mesoionic compound represented by the following general formula (1).

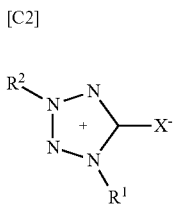

general formula (1)

(In general formula (1), $R^1$ and $R^2$ are each independently a $C_{1-7}$ hydrocarbyl group or oxygen-containing hydrocarbyl group and X is O or S.)

A mesoionic compound refers to a five-membered (or six-membered) heterocyclic ring compound that cannot be satisfactorily represented by a single covalent bond structure or ionic structure and that has 6 π-electrons in the ring. The mesoionic compound used in the invention, which has a tetrazolium mesoionic structure, has a five-membered ring composed of 4 nitrogen atoms and 1 carbon atom, and it is thought that aromaticity is achieved and stabilized by the extrusion of the negative charge to the exocyclic oxygen. The tetrazolium mesoionic compound used in the invention forms an intramolecular salt, i.e., becomes ionic, due to its polarity and forms a liquid at room temperature based on the alkyl group selected. In addition, being an intramolecular salt, it has a lower boiling point than intermolecular salts and is easily distilled.

The combination of a magnesium halide salt and an ether-type organic solvent is an example of a conventional electrolyte solution heretofore used in magnesium batteries. However, because the magnesium salt in such a conventional magnesium battery contains a halide anion, corrosion of the magnesium metal that is typically used for the negative electrode can be a problem. In addition, an unsatisfactory battery safety may also be a problem due to the evaporation of the organic solvent with elapsed time.

As noted above, conventional magnesium batteries that use an organic solvent, e.g., PC, in the electrolyte solution provide a small redox current. The inventors discovered that an electrolyte solution that uses a mesoionic compound with general formula (1) can provide, when used in a magnesium battery, a larger redox current than heretofore. The inventors also discovered that, since this mesoionic compound does not contain a halide anion, the effect is obtained that the electrolyte solution containing the mesoionic compound avoids corrosion of metallic magnesium.

The $R^1$ substituent located at position 1 of the tetrazolium ring in general formula (1) and the $R^2$ substituent located at position 3 of this tetrazolium ring are each a hydrocarbyl group constituted of the carbon and hydrogen atoms or an oxygen-containing hydrocarbyl group constituted of the carbon, hydrogen, and oxygen atoms. This oxygen-containing hydrocarbyl group denotes both groups in which hydrocarbyl chains are connected to each other by an oxygen atom and groups in which the hydroxyl group (—OH) replaces a portion of the hydrogen atoms in the hydrocarbyl group. The number of carbon atoms in $R^1$ and $R^2$ is for each generally 1 to 7, preferably 1 to 5, and more preferably 1 to 4. $R^1$ and $R^2$ may be the same substituent or may be different substituents from one other. Hydrocarbyl groups that may be used for $R^1$ and/or $R^2$ can be exemplified by the methyl group, ethyl group, n-propyl group, 1-methylethyl group (i-propyl group), n-butyl group, 2-methylpropyl group (i-butyl group), 1-methylpropyl group (s-butyl group), 1,1-dimethylethyl group (t-butyl group), n-pentyl group, 3-methylbutyl group (i-pentyl group), 1-methylbutyl group (s-pentyl group), 1,1-dimethylbutyl group (t-pentyl group), 2,2-dimethylbutyl group (neo-pentyl group), n-hexyl group, 4-methylpentyl group (i-hexyl group), n-heptyl group, 5-methylhexyl group (i-heptyl group), and phenyl group. The number of oxygen atoms present in $R^1$ and/or $R^2$ is in each case preferably 1 or 2 when $R^1$ and/or $R^2$ is an oxygen-containing hydrocarbyl group. Oxygen-containing hydrocarbyl groups that have one oxygen atom and that can be used for $R^1$ and/or $R^2$ can be exemplified by the methoxy group and hydroxymethyl group; ethoxy group, methoxymethyl group, and 2-hydroxyethyl group; n-propoxy group (—OC$_3$H$_7$), 2-methoxyethyl group (—C$_2$H$_4$OCH$_3$), and 3-hydroxy-n-propyl group (—C$_3$H$_6$OH); n-butoxy group (—OC$_4$H$_9$), 3-methoxy-n-propyl group (—C$_3$H$_6$OCH$_3$), and 4-hydroxy-n-butyl group (—C$_4$H$_8$OH); n-pentoxy group (—OC$_5$H$_{11}$), 4-methoxy-n-butyl group (—C$_4$H$_8$OCH$_3$), and 5-hydroxy-n-pentyl group (—C$_5$H$_{10}$OH); n-hexyloxy group (—OC$_6$H$_{13}$), 5-methoxy-n-pentyl group (—C$_5$H$_{10}$OCH$_3$), and 6-hydroxy-n-hexyl group (—C$_6$H$_{12}$OH); and n-heptyloxy group (—OC$_7$H$_{15}$), 6-methoxy-n-hexyl group (—C$_6$H$_{12}$OCH$_3$), and 7-hydroxy-n-heptyl group (—C$_7$H$_{14}$OH). Oxygen-containing hydrocarbyl groups that have two oxygen atoms and that can be used for $R^1$ and/or $R^2$ can be exemplified by the hydroxymethoxy group (—OCH$_2$OH) and dihydroxymethyl group (—CH(OH)$_2$); 2-hydroxyethoxy group (—OC$_2$H$_4$OH), hydroxymethoxymethyl group (—CH(OCH$_3$)(OH)), and 1,2-dihydroxyethyl group (—CH(OH)CH$_2$OH); 3-hydroxy-n-propoxy group (—OC$_3$H$_6$OH), dimethoxymethyl group (—CH(OCH$_3$)$_2$), and 2,3-dihydroxy-n-propyl group (—CH$_2$CH(OH)CH$_2$OH); 4-hydroxy-n-butoxy group (—OC$_4$H$_8$OH), 2-(methoxymethoxy)ethyl group (—C$_2$H$_4$OCH$_3$OCH$_3$), and 3,4-dihydroxy-n-butyl group (—C$_2$H$_4$CH(OH)CH$_2$OH); 5-hydroxy-n-pentoxy group (—OC$_5$H$_{10}$OH), 3-(methoxymethoxy)-n-propyl group (—C$_3$H$_6$OCH$_3$OCH$_3$), and 4,5-dihydroxy-n-pentyl group (—C$_3$H$_6$CH(OH)CH$_2$OH); 6-hydroxy-n-hexyloxy group (—OC$_6$H$_{12}$OH), 4-(methoxymethoxy)-n-butyl group (—C$_4$H$_8$OCH$_3$OCH$_3$), and 5,6-dihydroxy-n-hexyl group (—C$_4$H$_8$CH(OH)CH$_2$OH); and 7-hydroxy-n-heptyloxy group (—OC$_7$H$_{14}$OH), 5-(methoxymethoxy)-n-pentyl group (—C$_5$H$_{10}$OCH$_3$OCH$_3$), and 6,7-dihydroxy-n-heptyl group (—C$_5$H$_1$OCH(OH)CH$_2$OH).

The X located at position 5 in the tetrazolium ring in general formula (1) is oxygen (O) or sulfur (S). Between the two, X is preferably oxygen (O).

In addition to the mesoionic compound described hereinabove, the magnesium battery electrolyte solution according to the invention preferably also contains a magnesium salt as a supporting salt. The magnesium salt can be exemplified by inorganic magnesium salts such as Mg(OH)$_2$, Mg(PF$_6$)$_2$, Mg(BF$_4$)$_2$, and Mg(AsF$_6$)$_2$, and organic magnesium salts such as Mg(CF$_3$SO$_3$)$_2$, Mg(N(SO$_2$CF$_3$)$_2$)$_2$ (MgTFSA), Mg(N(SO$_2$C$_2$F$_5$)$_2$)$_2$, and Mg(C(SO$_2$CF$_3$)$_3$)$_2$. Combinations of two or more of such magnesium salts may also be used.

The concentration of the magnesium salt in the magnesium battery electrolyte solution is preferably 0.01 to 1.5 mol/kg. When the magnesium salt concentration is below 0.01 mol/kg, the magnesium salt concentration is then too low and there is too little magnesium ion and an inferior magnesium transport may occur as a result. When, on the other hand, the magnesium salt concentration exceeds 1.5 mol/kg, the magnesium salt concentration is then too high and as a consequence the viscosity of the electrolyte solution will be too high: this can result in an inferior magnesium transport. The concentration of the magnesium salt in the magnesium battery electrolyte solution is more preferably 0.05 to 1.4 mol/kg and is even more preferably 0.1 to 1.3 mol/kg.

An example of a method for producing the mesoionic compound used by the invention is described in the following. However, the production of the mesoionic compound used by the invention is not necessarily limited to only the method in this example. This production example is composed of the following steps (1) and (2).

(1) This step involves the production of a tetrazole-5-thione derivative having a $C_{1-7}$ hydrocarbyl group or oxygen-containing hydrocarbyl group at position 1 (this is also referred to below as the tetrazole-5-thione derivative).

(2) This step involves the production of a tetrazolium-5-olate derivative that has, independently from one other, a $C_{1-7}$ hydrocarbyl group or oxygen-containing hydrocarbyl group at positions 1 and 3 (this is also referred to below as the tetrazolium-5-olate derivative).

These steps (1) and (2) are particularly described in the following. First, in step (1), a tetrazole-5-thione derivative having a $C_{1-7}$ hydrocarbyl group or oxygen-containing hydrocarbyl group $R^1$ at position 1 is synthesized by reacting an alkali azide ($MN_3$ where M is an alkali metal) with an isothiocyanate ($R^1NCS$) as shown in reaction equation (a) below. An isothiocyanate having the desired $R^1$ substituent as described above can be used as the isothiocyanate ($R^1NCS$); for example, methyl isothiocyanate ($CH_3NCS$), ethyl isothiocyanate ($C_2H_5NCS$), propyl isothiocyanate ($C_3H_7NCS$), and so forth, can each be used.

[C3]

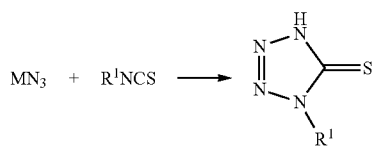

equation (a)

In the ensuing step (2), and as shown in reaction equation (b) below, the tetrazole-5-thione derivative synthesized in step (1) is mixed with an alcohol ($R^2OH$) and an acid, for example, sulfuric acid, and, after a prescribed period of time has elapsed, water is added and a suitable extraction process is run in order to separate a tetrazolium-5-thiolate derivative that has, independently from one other, a $C_{1-7}$ hydrocarbyl group or oxygen-containing hydrocarbyl group at positions 1 and 3 (this is also referred to below as the tetrazolium-5-thiolate derivative) into the organic layer and a tetrazolium cation having a $C_{1-7}$ hydrocarbyl group or oxygen-containing hydrocarbyl group at positions 1 and 3 and on the sulfur (S) (this is also referred to below as the tetrazolium cation) into the water layer. The desired tetrazolium-5-olate derivative is obtained by subjecting the tetrazolium cation to alkali decomposition by submitting the water layer to an alkali treatment with a base, for example, sodium hydroxide. For example, concentrated sulfuric acid, sulfonic acid, or a mixture of these strong acids can be used as the acid. The alcohol ($R^2OH$) can be an alcohol bearing the desired substituent $R^2$ as described above; for example, a secondary alcohol such as s-butyl alcohol ($C_2H_5(CH_3)CHOH$), an aromatic alcohol such as phenol, or a tertiary alcohol can be used.

[C4]

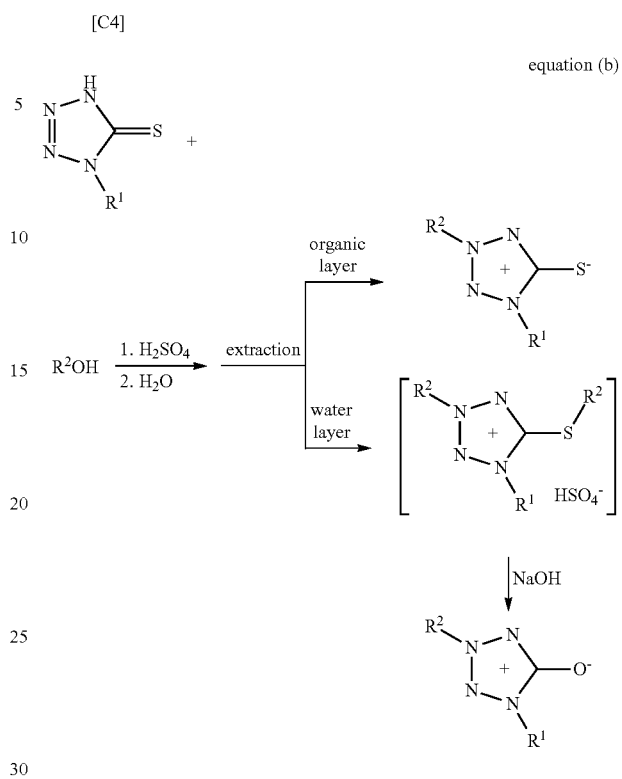

equation (b)

As shown in reaction equation (b), secondary production of the tetrazolium-5-thiolate derivative can occur in the process of obtaining the tetrazolium-5-olate derivative. In order to obtain the desired tetrazolium-5-olate efficiently, a method can be contemplated in which, by using two or more equivalents of the alcohol ($R^2OH$) relative to the tetrazolium-5-thione derivative, the tetrazolium cation is selectively synthesized and the tetrazolium-5-olate derivative is then obtained by alkali decomposition. The tetrazolium-5-thiolate derivative produced as a by-product can also be converted into the desired tetrazolium-5-olate derivative by carrying out the following steps (3) and (4).

(3) In this step, the tetrazolium-5-thiolate derivative is converted to the tetrazolium cation.

(4) In this step, the tetrazolium-5-olate derivative is produced by the alkali decomposition of the tetrazolium cation.

First, in step (3), the tetrazolium cation is synthesized by alkylating or arylating the sulfur (S) in the tetrazolium-5-thiolate derivative, as shown below in reaction equation (c). The combination of an alcohol ($R^3OH$) and an acid as in reaction equation (b) or, for example, a common alkylating agent, e.g., methyl iodide (MeI) or methyl triflate (MeOTf), can be used as the alkylating agent or arylating agent.

[C5]

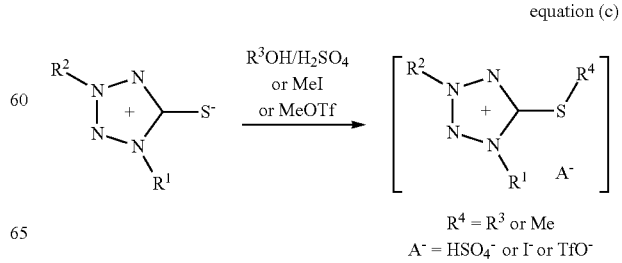

equation (c)

$R^4 = R^3$ or Me
$A^- = HSO_4^-$ or $I^-$ or $TfO^-$

The tetrazolium-5-olate derivative is then synthesized in step (4) by alkali decomposition of the tetrazolium cation, as shown in reaction equation (d) below. A base, e.g., sodium hydroxide, as indicated above or an aqueous solution of the base can be used as the alkali treatment agent.

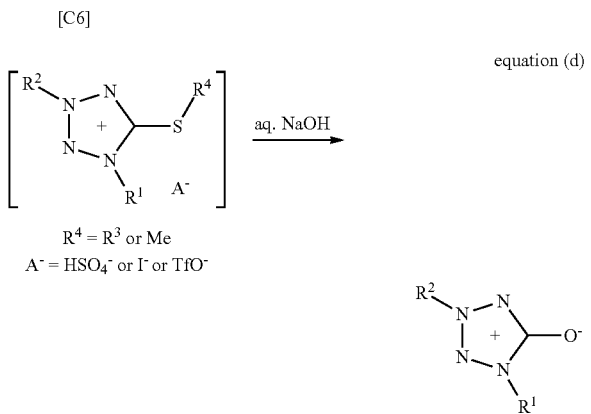

equation (d)

$R^4 = R^3$ or Me
$A^- = HSO_4^-$ or $I^-$ or TfO$^-$

In addition to the previously described mesoionic compound and magnesium salt, the magnesium battery electrolyte solution according to the invention may also contain a nonaqueous electrolyte. A nonaqueous electrolyte solution and a nonaqueous gel electrolyte can be used as the nonaqueous electrolyte. The nonaqueous electrolyte solution generally contains the previously described magnesium salt and a nonaqueous solvent. This nonaqueous solvent can be exemplified by ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, acetonitrile, 1,2-dimethoxyethane, 1,3-dimethoxypropane, diethyl ether, tetrahydrofuran, 2-methyltetrahydrofuran, and mixtures of the preceding. The concentration of the magnesium salt in the nonaqueous electrolyte solution is, for example, in the range from 0.5 to 3 mol/kg.

The nonaqueous gel electrolyte used in the invention is generally provided by gelation by the addition of a polymer to a nonaqueous electrolyte solution. It can be obtained, for example, by effecting gelation by adding a polymer, e.g., polyethylene oxide (PEO), polyacrylonitrile (PAN), or polymethyl methacrylate (PMMA), to a nonaqueous electrolyte solution as described above. For example, an MgTFSA (MgN(CF$_3$SO$_2$)$_2$)-PEO system nonaqueous gel electrolyte can be used in the invention.

2. The Magnesium Battery

The magnesium battery of the invention is provided with at least a positive electrode, a negative electrode, and an electrolyte solution layer interposed between the positive electrode and negative electrode, wherein this electrolyte solution layer contains the magnesium battery electrolyte solution that has been described hereinabove.

FIG. 1 is a drawing that illustrates an example of the layer structure in a magnesium battery according to the invention, wherein the drawing schematically illustrates a cross section cut in the lamination direction. The magnesium battery according to the invention is not necessarily limited to only this example. The magnesium battery 100 has a positive electrode 6, which is provided with a positive electrode active material layer 2 and a positive electrode current collector 4; a negative electrode 7, which is provided with a negative electrode active material 3 and a negative electrode current collector 5; and an electrolyte solution layer 1, which is sandwiched between the positive electrode 6 and the negative electrode 7. The magnesium battery electrolyte solution present in the electrolyte solution layer in the magnesium battery according to the invention is as has been described above. A detailed description follows for the positive and negative electrodes that constitute the magnesium battery according to the invention as well as for a separator and battery case that are favorably used in the magnesium battery according to the invention.

The positive electrode used in the invention is preferably provided with a positive electrode active material layer that contains a positive electrode active material, and in addition is also ordinarily provided with a positive electrode current collector and a positive electrode lead that is connected to this positive electrode current collector.

The positive electrode active material used in the invention should be capable of carrying out the insertion and extraction of magnesium and/or the magnesium ion, but is not otherwise particularly limited and can be exemplified by vanadium pentoxide (V$_2$O$_5$), MnO$_2$, MnO$_3$, and so forth. Only a single one of these positive electrode active materials may be used in the invention, or a combination of two or more positive electrode active materials may be used. The overall content of the positive electrode active material in the positive electrode active material layer will generally be in the range from 50 to 90 mass %.

The thickness of the positive electrode active material layer used in the invention will vary with, inter alia, the application for the intended battery, but is preferably in the range from 10 to 250 μm, more preferably in the range from 20 to 200 μm, and in particular is most preferably in the range from 30 to 150 μm.

The average particle size of the positive electrode active material is, for example, in the range from 1 to 50 μm, and, within this range, is preferably in the range from 1 to 20 μm and particularly preferably is in the range from 3 to 5 μm. The handling characteristics may be poor when the average particle size of the positive electrode active material is too small, while obtaining a flat positive electrode active material layer may be a problem when the average particle size of the positive electrode active material is too large. The average particle size of the positive electrode active material can be determined, for example, by measuring the particle size for the active material carrier observed using a scanning electron microscope (SEM) and taking the average value.

As necessary, the positive electrode active material layer may contain an electroconductive material, a binder, and so forth. The electroconductive material used in the invention should be able to raise the electroconductivity of the positive electrode active material layer, but is not otherwise particularly limited and can be exemplified by carbon blacks such as acetylene black and Ketjen black. The content of the electroconductive material in the positive electrode active material layer will vary with the type of electroconductive material, but is generally in the range from 1 to 10 mass %.

The binder used in the invention can be exemplified by polyvinylidene fluoride (PVDF), polytetrafluoroethylene (PTFE), and so forth. The content of the binder in the positive electrode active material layer should be an amount sufficient to immobilize, inter alia, the positive electrode active material and is preferably relatively low. The binder content is generally in the range from 1 to 10 mass %.

The positive electrode current collector used in the invention functions to collect current from the positive electrode active material layer. The material of this positive electrode current collector can be exemplified by aluminum, SUS, nickel, iron, and titanium, among which aluminum and SUS are preferred. The shape of the positive electrode current collector can be, for example, foil, plate, mesh, and so forth, among which a foil shape is preferred.

The electrode active material layer of the electrode for at least one of the positive and negative electrodes may also assume a structure that additionally contains an electrode electrolyte. In this case, for example, the magnesium battery electrolyte solution according to the invention, the gel electrolyte described above, or a solid electrolyte, e.g., a solid oxide electrolyte, a solid sulfide electrolyte, and so forth, can be used as the electrode electrolyte.

The method of producing the positive electrode used in the invention should be a method that can yield a positive electrode as described above, but is not otherwise particularly limited. After the positive electrode active material layer has been formed, the positive electrode active material layer may be pressed in order to raise the electrode density.

The negative electrode used in the invention is preferably provided with a negative electrode active material layer that contains a negative electrode active material, and, in addition to this, is ordinarily provided with a negative electrode current collector and a negative electrode lead connected to this negative electrode current collector.

The negative electrode active material layer used in the invention contains a negative electrode active material containing a metal, an alloy material, and/or a carbonaceous material. For example, magnesium metal, a magnesium alloy, a metal oxide containing the element magnesium, a metal sulfide containing the element magnesium, a metal nitride containing the element magnesium, or a carbonaceous material such as graphite can be used as the negative electrode active material. The negative electrode active material may take the form of a particulate or a thin film. The layer thickness of the negative electrode active material layer is not particularly limited and can be, for example, within the range from 10 to 100 μm and, within this range, the range of 10 to 50 μm is preferred.

The same materials and shapes indicated above for the positive electrode current collector can be used for the material and shape of the negative electrode current collector.

A separator impregnated with the magnesium battery electrolyte solution according to the invention may be provided between the positive and negative electrodes in the magnesium battery according to the invention. This separator can be exemplified by porous films of polyethylene or polypropylene and by nonwoven fabrics such as resin-based nonwoven fabrics and glass fiber nonwoven fabrics.

The magnesium battery according to the invention generally has a battery case that houses the positive electrode, magnesium battery electrolyte solution, negative electrode, and so forth. The shape of the battery case can be exemplified by coin configurations, flat plate configurations, cylindrical configurations, laminate configurations, and so forth.

The invention is more specifically described by the examples and comparative examples provided below, but the invention is not limited to only these examples.

1. 1-ethyltetrazole-5-thione was synthesized according to the following reaction equation ($a_1$) as step (1) in the synthesis of 1-ethyl-3-(1-methylpropyl)tetrazolium-5-olate.

[C7]

equation ($a_1$)

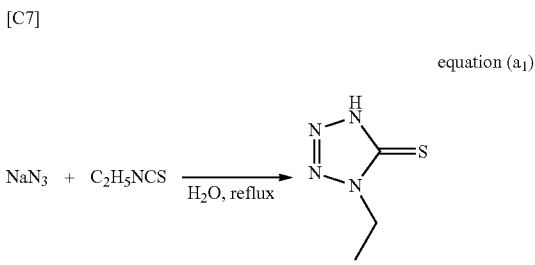

Thus, sodium azide (0.11 g, 1.7 mmol), 1-ethyl isothiocyanate (96 μL, 1.1 mmol), and water (2.0 mL) were added to a recovery flask and were stirred for 24 hours under reflux (120° C.). After the reaction solution had been allowed to cool, the organic compound was extracted with methylene chloride. In addition, the water layer was made acidic (pH<1) and the organic compound was extracted with ether. The resulting methylene chloride layer and ether layer were both dried over anhydrous sodium sulfate and the solvent was distilled from each: a yellow liquid (14 mg) was obtained from the methylene chloride layer and 1-ethyltetrazole-5-thione (0.10 g, 71%) was obtained from the ether layer.

1-ethyl-3-(1-methylpropyl)tetrazolium-5-olate was then synthesized in step (2) according to reaction equation ($b_1$) given below.

equation ($b_1$)

[C8]

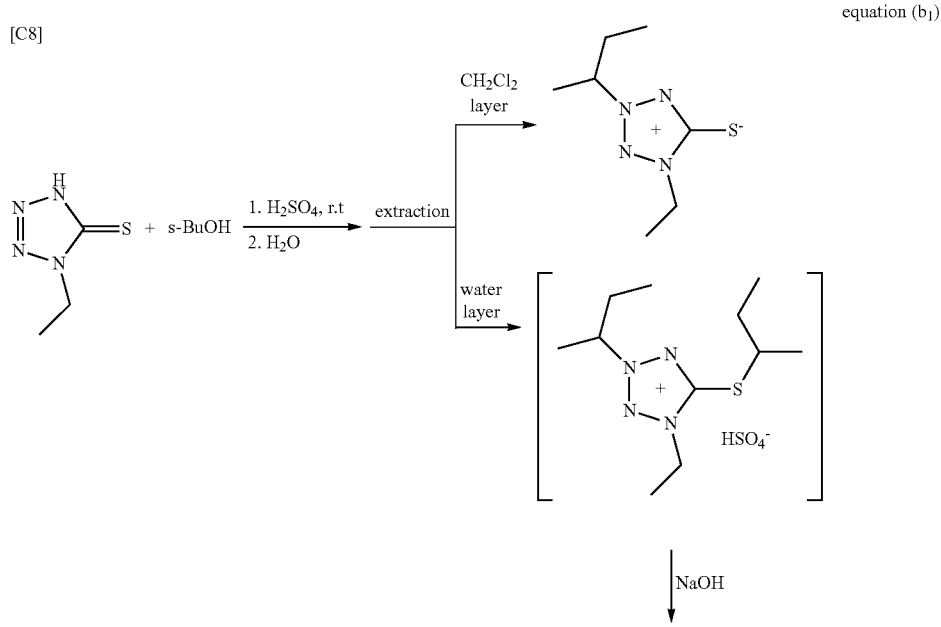

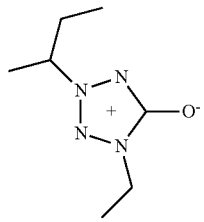

Thus, 1-ethyltetrazole-5-thione (130 mg, 1.0 mmol) and the acid were added to a recovery flask with dissolution and C₂H₅(CH₃)CHOH (s-BuOH, 92 µL, 1.0 mmol) was gradually added dropwise to the resulting solution and stirring was performed for 2 hours at room temperature. After this, the reaction solution was ice-cooled and water was gradually added using a dropping funnel to the reaction solution on the ice bath. The organic compound was extracted from this acidic aqueous solution with methylene chloride, and the obtained methylene chloride layer was washed with aqueous sodium carbonate solution (pH=11). After washing, the methylene chloride layer was dried over anhydrous sodium sulfate, and the solvent was then removed by distillation to obtain 1-ethyl-3-(1-methylpropyl)tetrazolium-5-thiolate (yield=132 mg, 71%). NaOH was added to the acidic aqueous solution that was the extraction mother liquor to make it basic (pH>14); the organic compound was extracted with methylene chloride; drying over anhydrous sodium sulfate was performed; and the solvent was distilled out to obtain 1-ethyl-3-(1-methylpropyl)tetrazolium-5-olate (yield=21 mg, 12%).

A description follows of the method for obtaining the tetrazolium-5-olate derivative by alkylation of the tetrazolium-5-thiolate derivative on the S followed by alkali decomposition. First, the 1-methyl-3-(1-methylpropyl)-5-(1-methylpropyl)tetrazolium tetrafluoroborate was synthesized according to the following reaction equation (c₁) in step (3).

[C9]

equation (c₁)

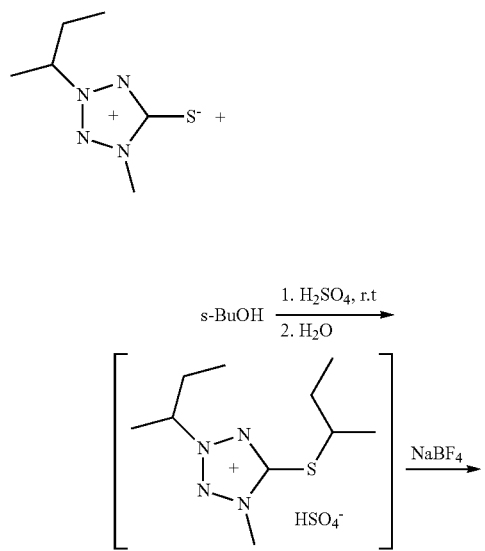

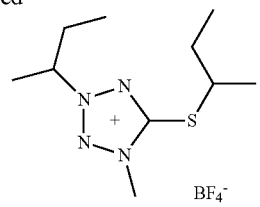

1-methyl-3-(1-methylpropyl)tetrazolium-5-thiolate (173.7 mg, 1.0 mmol) was introduced into a recovery flask; concentrated sulfuric acid (1.7 mL) and C₂H₅(CH₃)CHOH (s-BuOH, 92.0 µL, 1.0 mmol) were added to this; and stirring was performed for 13 hours. Then, while on an ice bath, an aqueous sodium hydroxide solution (30.0 mmol, 10 mL) and aqueous sodium bicarbonate (30.0 mmol, 10.0 mL) were added dropwise using a dropping funnel. More aqueous sodium bicarbonate was added to bring to neutrality (pH=6-7). Extraction with methylene chloride, washing with an aqueous sodium carbonate solution, drying over anhydrous sodium sulfate, and distillation of the solvent yielded a yellow liquid. On the other hand, sodium fluoroborate (165.0 mg, 1.5 mmol) was added to the water layer followed by extraction with methylene chloride, drying over anhydrous sodium sulfate, and removal of the solvent by distillation to obtain 1-methyl-3-(1-methylpropyl)-5-(1-methylpropylthio)tetrazolium tetrafluoroborate (yield=237.1 mg, 75%).

1-methyl-3-(1-methylpropyl)-5-(1-methylpropylthio)tetrazolium tetrafluoroborate colorless liquid $^1$H-NMR (300 MHz, CDCl₃): δ 1.01 (t, J=7.5 Hz, 3H), 1.08 (t, J=7.35 Hz, 3H), 1.56 (d, J=6.9 Hz, 3H), 1.77 (d, J=6.6 Hz, 3H), 1.81-1.92 (m, 2H), 1.97-2.12 (m, 1H), 2.13-2.25 (m, 1H), 3.94 (sex, J=6.6 Hz, 1H), 4.21 (s, 3H), 5.01 (sex, J=6.9 Hz, 1H), $^{13}$C-NMR (75 MHz, CDCl₃): δ 9.7, 11.0, 18.5, 20.4, 28.5, 29.4, 36.8, 48.4, 67.9, 161.5

IR (neat, cm$^{-1}$): 3638, 2972, 1686, 1461, 1238, 1058, 737

HRMS (ESI+): m/z Calcd. for C₁₀H₂₁H₄S: 229.1487, found: 229.1487

HRMS (ESI−): m/z Calcd. for BF₄: 87.0009. found: 87.0036

Anal. Calcd. for C₁₀H₂₁BF₄N₄S (316.17)

calculated: C: 37.99, H : 6.69, N : 17.72 found: C: 37.86, H : 6.60, N : 17.74

In step (4), 1-methyl-3-(1-methylpropyl)tetrazolium-5-olate was synthesized by alkali decomposition according to reaction equation (d₁).

[C10]

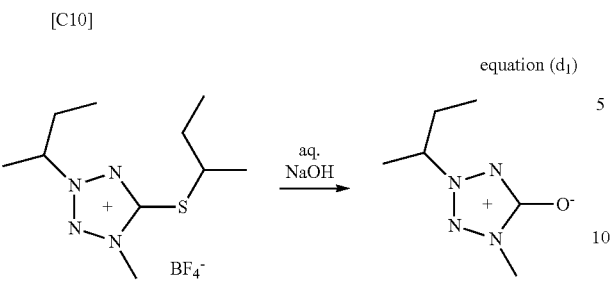

equation (d₁)

Thus, 1-methyl-3-(1-methylpropyl)-5-(1-methylpropylthio)tetrazolium tetrafluoroborate (137 mg, 0.43 mmol) was introduced into a recovery flask; an aqueous sodium hydroxide solution (prepared by the dissolution of sodium hydroxide (24 mg, 0.60 mmol) in water (10 mL)) was added to the recovery flask; and stirring was carried out for 30 minutes. Extraction with methylene chloride, drying over anhydrous sodium sulfate, and distillation of the solvent yielded 1-methyl-3-(1-methylpropyl)tetrazolium-5-olate (yield=65 mg, 100%).

2. Preparation of the magnesium battery electrolyte solution

EXAMPLE 1

Magnesium bis(trifluoromethanesulfonyl)amide (also referred to below as MgTFSA) was weighed out and mixed into the 1-ethyl-3-(1-methylpropyl)tetrazolium-5-olate (also referred to below as EsBTO) synthesized according to steps (1) and (2) so as to provide a concentration of the MgTFSA in the EsBTO of 0.5 mol/kg and was dissolved to homogeneity to prepare the magnesium battery electrolyte solution of Example 1.

EXAMPLE 2

MgTFSA was weighed out and mixed into 1-ethyl-3-methyltetrazolium-5-olate (also referred to below as EMTO) as represented by formula (1a) below so as to provide a concentration of the MgTFSA in the EMTO of 0.5 mol/kg and was dissolved to homogeneity to prepare the magnesium battery electrolyte solution of Example 2.

[C11]

formula (1a)

EXAMPLE 3

MgTFSA was weighed out and mixed into 1-(2-methoxyethyl)-3-methyltetrazolium-5-olate (also referred to below as MOEMTO) as represented by formula (1b) below so as to provide a concentration of the MgTFSA in the MOEMTO of 0.5 mol/kg and was dissolved to homogeneity to prepare the magnesium battery electrolyte solution of Example 3.

[C12]

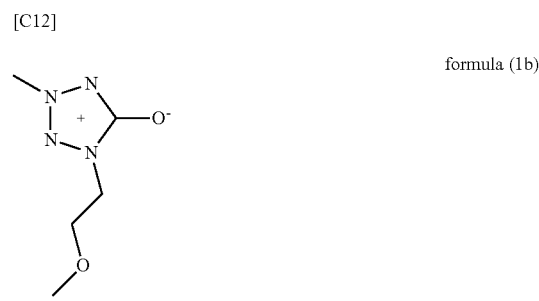

formula (1b)

COMPARATIVE EXAMPLE 1

MgTFSA was weighed out and mixed into N,N-diethyl-N-methyl-N-(2-methoxyethyl)ammonium bis(trifluoromethanesulfonyl)amide (also referred to below as DEMETFSA) as represented by formula (2) below so as to provide a concentration of the MgTFSA in the DEMETFSA of 0.5 mol/kg and was dissolved to homogeneity to prepare the magnesium battery electrolyte solution of Comparative Example 1.

[C13]

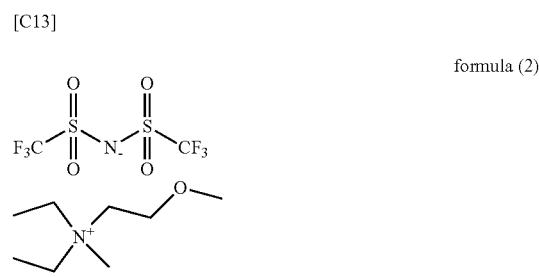

formula (2)

COMPARATIVE EXAMPLE 2

MgTFSA was weighed out and mixed into dimethoxyethane (DME) as represented by formula (3) below so as to provide a concentration of the MgTFSA in the DME of 0.5 mol/kg and was dissolved to homogeneity to prepare the magnesium battery electrolyte solution of Comparative Example 2.

[C14]

formula (3)

3. Electrochemical Measurements

The dissolution and deposition activity of magnesium metal was evaluated by performing electrochemical measurements under the following conditions with the magnesium battery electrolyte solutions of Examples 1 to 3 and Comparative Examples 1 and 2.

Measurement cell
working electrode: magnesium metal (diameter 6 mm)
counter electrode: magnesium metal (diameter 6 mm)
Measurement instrumentation: potentiostat/galvanostat (Solartron)
Measurement method: cyclic voltammetry (sweep rate: 100 mV/s)

Measurement temperature: 25° C.

Measurement atmosphere: argon atmosphere

Figure 2:
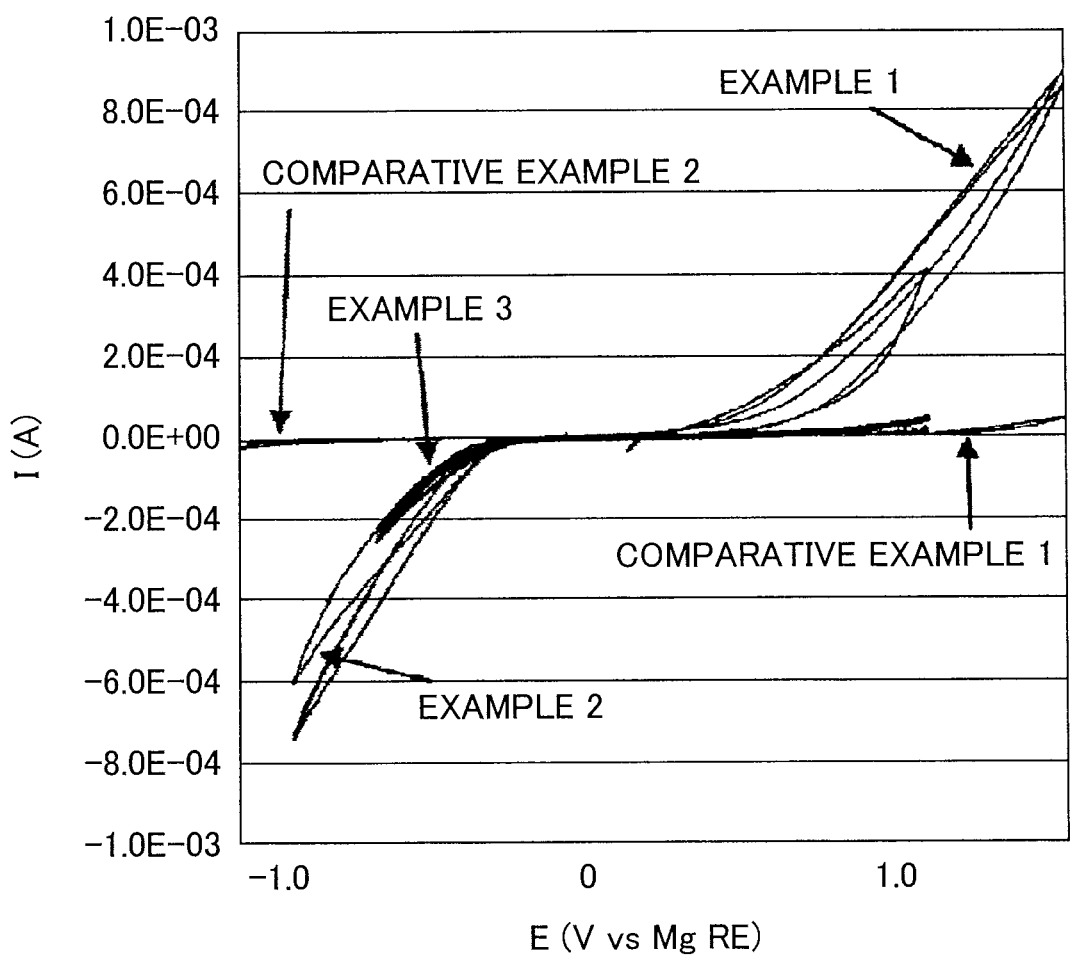
FIG. 2 is graph that overlays the cyclic voltammograms (CVs) of the magnesium battery electrolyte solutions in Examples 1 to 3 and Comparative Examples 1 and 2.

FIG. 2 is graph that overlays the cyclic voltammograms (CVs) of the magnesium battery electrolyte solutions in Examples 1 to 3 and Comparative Examples 1 and 2, wherein the current I (A) is plotted on the vertical axis and the potential E (V versus MgRE) is plotted on the horizontal axis of the graph. As may be understood from FIG. 2, the oxidation current at 1.0 V (versus MgRE) was very small, at less than $1.0 \times 10^{-5}$ A, for both the magnesium battery electrolyte solution of Comparative Example 1, which used a conventional ionic liquid in the form of DEMETFSA, and the magnesium battery electrolyte solution of Comparative Example 2, which used the organic solvent DME. On the reduction side, only a very small reduction current was again present. On the other hand, the oxidation current at 1.0 V (versus MgRE) in all instances exceeded $2.0 \times 10^{-4}$ A for the magnesium battery electrolyte solution of Example 1, which used EsBTO, the magnesium battery electrolyte solution of Example 2, which used EMTO, and the magnesium battery electrolyte solution of Example 3, which used MOEMTO. In addition, the reduction current at −0.5 V (versus MgRE) was below $-1.0 \times 10^{-4}$ A for all of the magnesium battery electrolyte solutions of Examples 1 to 3. Thus, the preceding demonstrates that, in comparison to conventional magnesium battery electrolyte solutions, the magnesium battery electrolyte solutions that use a mesoionic compound with general formula (1) exhibit both a larger oxidation current accompanying magnesium metal dissolution and a larger reduction current accompanying magnesium metal deposition, with the oxidation current being particularly large between the two.

What is claimed is:

1. An electrolyte solution for a magnesium battery, comprising
    a mesoionic compound represented by the following general formula (1):

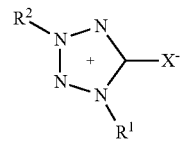

general formula (1)

wherein in general formula (1), $R^1$ and $R^2$ are each independently a $C_{1-7}$ hydrocarbyl group or oxygen-containing hydrocarbyl group and X is O or S, and
    a magnesium salt.

2. The electrolyte solution for a magnesium battery according to claim 1, wherein the magnesium salt is at a concentration of 0.01 to 1.5 mol/kg.

3. The electrolyte solution for a magnesium battery according to claim 1, wherein the magnesium salt is at a concentration of 0.05 to 1.4 mol/kg.

4. The electrolyte solution for a magnesium battery according to claim 1, wherein the magnesium salt is at a concentration of 0.1 to 1.3 mol/kg.

5. The electrolyte solution for a magnesium battery according to claim 1, wherein the magnesium salt is a supporting salt, and the magnesium salt is a single selection or a combination of two or more selections from $Mg(OH)_2$, $Mg(PF_6)_2$, $Mg(BF_4)_2$, $Mg(AsF_6)_2$, $Mg(CF_3SO_3)_2$, $Mg(N(SO_2CF_3)_2)_2$ (MgTFSA), $Mg(N(SO_2C_2F_5)_2)_2$, and $Mg(C(SO_2CF_3)_3)_2$.

6. A magnesium battery comprising: at least a positive electrode; a negative electrode; and an electrolyte solution layer interposed between the positive electrode and the negative electrode,
    wherein the electrolyte solution layer contains the electrolyte solution for a magnesium battery according to claim 1.

* * * * *